Nov. 21, 1944.    J. H. HUNT ET AL    2,363,183
VEHICLE WHEEL
Filed April 6, 1942    3 Sheets-Sheet 1
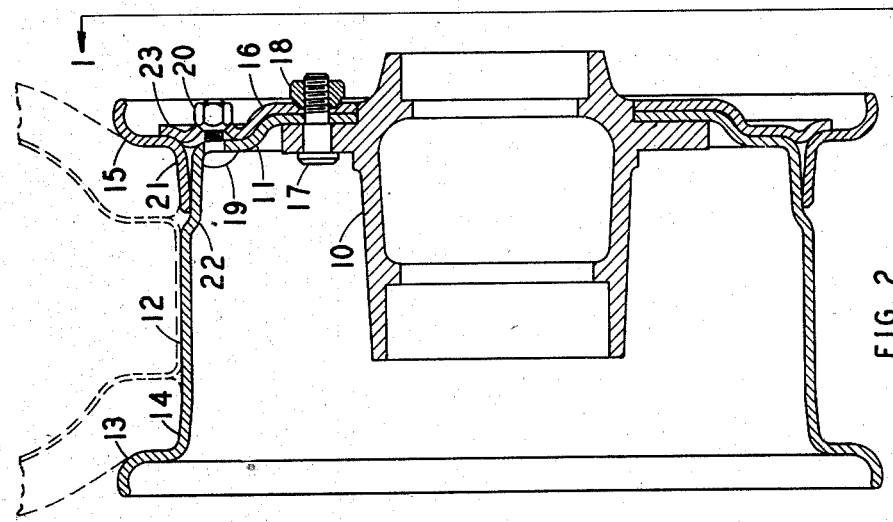
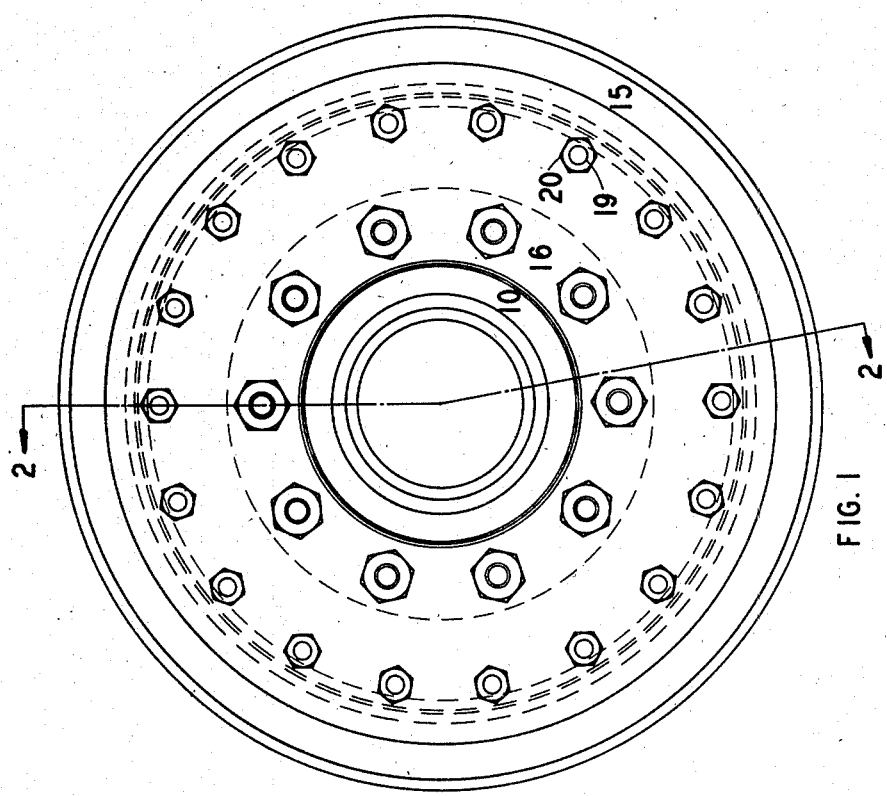
INVENTOR.
J HAROLD HUNT
AND
BY    HARRY J. HORN Nov. 21, 1944.    J. H. HUNT ET AL    2,363,183
VEHICLE WHEEL
Filed April 6, 1942    3 Sheets-Sheet 2

INVENTOR.
J HAROLD HUNT
AND
HARRY J. HORN
BY Carroll R. Faber, Atty

Nov. 21, 1944.                J. H. HUNT ET AL                2,363,183
                                VEHICLE WHEEL
                           Filed April 6, 1942        3 Sheets-Sheet 3
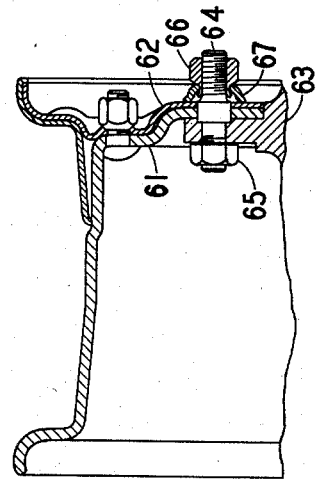
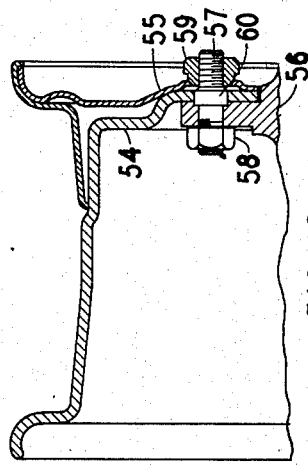
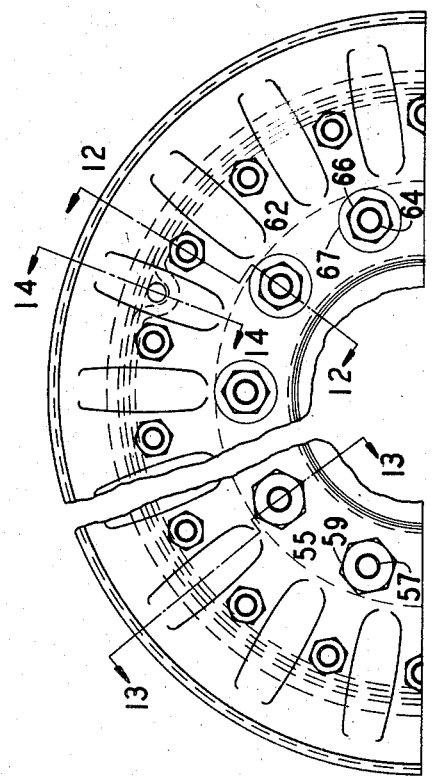
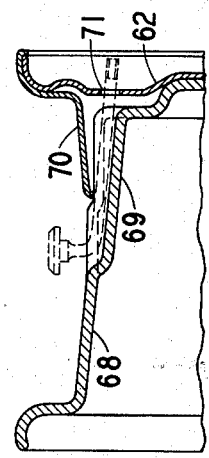
BY
INVENTOR.
J HAROLD HUNT
AND
HARRY J. HORN Patented Nov. 21, 1944

2,363,183

UNITED STATES PATENT OFFICE 2,363,183

VEHICLE WHEEL

J Harold Hunt and Harry J. Horn, Lansing, Mich., assignors to Motor Wheel Corporation, Lansing, Mich., a corporation of Michigan Application April 6, 1942, Serial No. 437,806

11 Claims. (Cl. 301—63)

This invention relates to vehicle wheels and more particularly to wheels including rims of the type employing removable tire retaining side flanges.

The principal object of this invention is to provide a simple and inexpensive wheel of the character referred to above. More specifically, the objects include the provision of raised tire bead seats at the opposite sides of the rim in such a wheel; the provision of a one piece member comprising a load carrying disk, a rim base and a tire retaining side flange; the provision of a one piece member comprising a removable tire retaining side flange and raised tire bead seat; the provision of a retaining disk which serves to detachably position the removable tire retaining side flange upon the rim and at the same time to reinforce the load carrying disk; and the provision of a novel construction and arrangement of parts whereby the load carrying disk, the removable tire retaining side flange, and the retaining disk are all detachably connected together by common securing means.

Other objects more or less incidental and ancillary to the foregoing will appear from an examination of the following description when read in connection with the accompanying drawings, wherein Figure 1 is a side view in elevation of a wheel embodying the present invention;

Figure 2 is a sectional view taken on substantially the line 2—2 of Figure 1;

Figure 8:
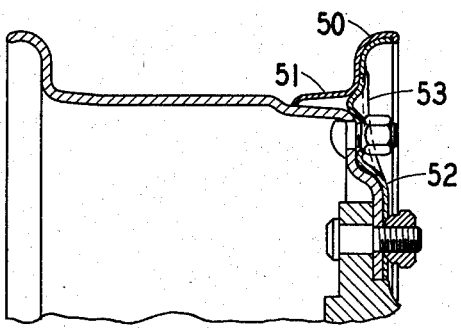
Figure 7:
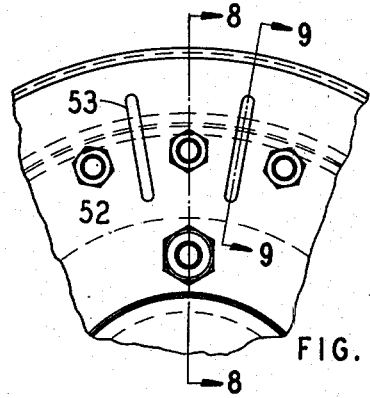
Figure 9:
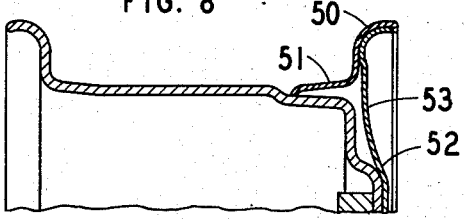

Figure 7 is a fragmentary elevational view and Figures 8 and 9 are fragmentary sectional views of another modified form of wheel; and Figures 10 and 11 are fragmentary elevational views and Figures 12, 13 and 14 are fragmentary sectional views of still further modifications.

The wheel shown in Figures 1 and 2 includes a hub 10; a load carrying disk 11; a rim base 12 having an integral tire retaining side flange 13 at one side thereof and provided with a raised tire bead seat 14 adjacent the flange 13; a removable tire retaining side flange 15 mounted upon the opposite side of the rim; a retaining disk 16; securing means in the form of studs 17 and nuts 18 for detachably securing the load carrying disk to the hub 10; and securing means in the form of studs 19 and nuts 20 for detachably securing the retaining disk 16 to the load carrying disk 11 to lock the removable tire retaining side flange 15 in position upon the rim base.

The load carrying disk 11, the rim base 12, the tire retaining side flange 13 and the tire bead seat 14 are all integral with each other and are formed as a one piece member. The removable tire retaining side flange 15 is of generally L-shape in cross section and includes an annular portion 21 which serves as a raised tire bead seat positioned at the opposite side of the rim from the seat 14. In order to accommodate the removable tire bead seat 21 and to facilitate the installation thereof upon the rim, the rim base is depressed as indicated at 22.

It will be understood from an examination of Figure 2 that the retaining disk 16 serves to lock the removable tire retaining flange 15 and tire bead seat 21 in position upon the rim base. The retaining disk 16 also serves to reinforce the load carrying disk 11. To that end the retaining disk 16 is of slightly greater radial extent than the load carrying disk 11 and is formed to conform to the configuration of the disk 11.

Preferably the retaining disk 16 is formed to provide a shoulder 23 adjacent the periphery which serves as a seat for the removable tire retaining flange 15. Surrounding the openings therein through which the studs 19 extend the retaining disk 16 is formed to provide a boss or raised seat which is engaged by the nut 20 when the latter is threaded home upon the stud. These bosses serve to provide some flexibility in the disk 16 so as to produce a lock washer effect when the nut 20 is tightened upon the stud 19.

It will be understood, of course, that the removable tire retaining side flange 15 is employed for the purpose of facilitating the mounting and demounting of a pneumatic tire, such as that shown in dotted lines in Figure 2. The raised tire bead seats 14 and 21 also serve to facilitate the removal of a tire and to provide an improved fit between the tire and rim which prevents "creeping" of the tire upon the rim. Where such beads are not employed the tire has a tendency to "freeze" to the rim.

Figure 4:
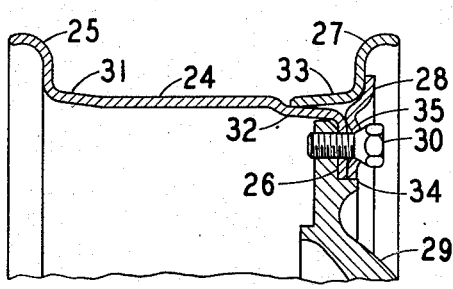
Figures 3 and 4 are fragmentary elevational and sectional views, respectively, of a modified form of wheel.
Figure 3:
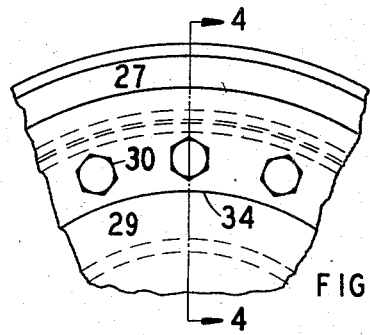

The wheel shown in Figures 3 and 4 includes a rim base 24 having an outturned flange 25 at one edge thereof and an inturned flange 26 at the other edge thereof; a generally L-shaped removable tire retaining side flange 27; a retaining disk 28; a hub 29; and means for securing the hub 29, the load carrying disk 26 and the retaining disk 28 together comprising cap screws 30.

The rim base 24 is provided with a raised tire bead seat 31 adjacent the integral flange 25 and is provided with a portion of reduced circumference at 32 adjacent the opposite side thereof. The removable tire retaining side flange 27 includes an annular portion 33 mounted upon the rim base 24 which serves as a raised tire bead seat to cooperate with the seat 31.

The inturned flange 26 of the rim base 24 constitutes a load carrying disk of limited radial extent. The hub 29 is formed with a shoulder at 34 upon which the inner periphery of the inturned flange 26 and the inner periphery of the retaining disk 28 are centered in assembling these parts. The hub flange 29 is tapped to receive the threads of the cap screws 30. The inturned rim flange 26 and the retaining disk 28 are provided with cooperating openings to receive the shanks of the cap screws 30. Thus, when the cap screws are threaded home these parts are detachably connected together so as to lock the removable tire retaining side flange 27 and bead seat 33 in position upon the rim base 24. The retaining disk 28 is provided with bosses 35 surrounding the openings through which the cap screws 30 extend to provide a lock washer effect when the cap screws are threaded home.

Figure 6:
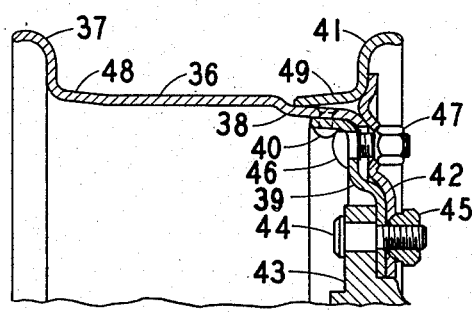
Figures 5 and 6 are fragmentary elevational and sectional views of a further modified form of wheel.
Figure 5:
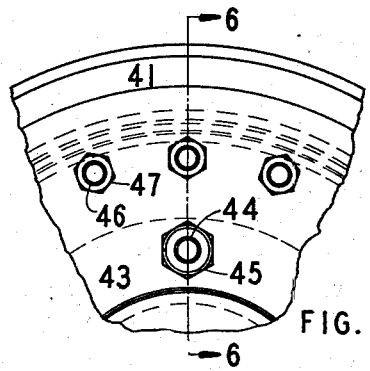

The wheel shown in Figures 5 and 6 includes a generally cylindrical rim base 36 having an integral tire retaining side flange 37 at one edge thereof and a portion 38 of reduced circumference adjacent the other end thereof; a load carrying disk 39 having its outer periphery secured to the rim base by rivets 40; a generally L-shaped removable tire retaining side flange 41; a retaining disk 42; a hub 43; means for securing the load carrying disk 39 and retaining disk 42 to the hub comprising studs 44 and nuts 45; and means for securing the retaining disk 42 and the load carrying disk 39 comprising studs 46 and nuts 47.

The rim base 36 is provided with an integral tapered tire bead seat 48 adjacent the tire retaining side flange 37. The removable tire retaining side flange 41 is provided with an annular portion 49 which constitutes a tire bead seat to cooperate with the seat 48. The annular portion 49 is mounted upon the portion 38 of the rim base which is of reduced circumference and overlies the rivets 40. The retaining disk 42 is formed to conform generally to the configuration of the load carrying disk 39 and is provided with bosses surrounding the openings through which the studs 46 extend which are engaged by the nuts 47 when the latter are threaded home upon the studs.

As in the case of the constructions previously described, it will be apparent that the retaining disk 42 serves to lock the removable tire retaining side flange 41 and bead seat 48 upon the rim base 36 and to reinforce the load carrying disk 39.

The wheel shown in Figures 7, 8 and 9 is generally similar to the constructions previously described, except that in this modification the removable tire retaining side flange 50 and raised bead seat 51 are formed of thinner stock than the remainder of the rim, as is also the retaining disk 52. In this modification the retaining disk 52 is of the same radial extent as the removable tire retaining side flange 50 and is formed to conform therewith and to serve as a reinforcement thereof. The retaining disk also is formed to conform to the load carrying disk and to reinforce it.

In order to strengthen the retaining disk 52 and the parts reinforced thereby, the disk 52 is provided with radially extending circumferentially spaced apart ribs 53. The axial extent of the ribs 53 will be observed by comparing the section shown in Figure 9 with that shown in Figure 8.

Figures 10 and 13 illustrate a wheel which is generally similar to the modifications previously described, and particularly that illustrated in Figures 7, 8 and 9, with the exception of the means employed for securing the load carrying disk 54 and the retaining disk 55 to the hub 56. In this modification the securing means includes a stud 57 which is threaded at its opposite extremities to receive nuts 58 and 59 and is provided intermediate its opposite extremities with an enlarged shank portion 60 which is received in the opening provided for that purpose in the load carrying disk 54. The retaining disk 55 is provided with bosses surrounding the openings through which the studs 57 extend and the bosses are provided with concave seats to receive the convex faces of the nuts 59.

The construction shown in Figures 11, 12 and 14 is substantially like that shown in Figures 10 and 13 except for the construction of the securing means which are employed for securing the load carrying disk 61 and the retaining disk 62 to the hub 63. In this modification the securing means include a stud 64 threaded at its opposite extremities to receive nuts 65 and 66. Associated with the nut 66 is a washer 67 of generally frustoconical section which is sufficiently flexible to provide a lock washer effect when the nut 66 is threaded home on the stud 64.

Provision is made in the wheel shown in Figures 11, 12 and 14 to accommodate a tire valve stem, such as that shown in dotted lines in Figure 14. For that purpose the rim base 68 is provided with an axially elongated depression 69 which underlies the removable tire bead seat 70; and the retaining disk 62 is provided with an opening 71 which is aligned with the depression 69. By this arrangement there is provided a passageway from a midpoint on the rim base to the exterior of the wheel at the side thereof.

One of the outstanding advantages of the present invention is the fact that the entire construction, with the exception of the hub, can be formed from sheet metal by suitable cold rolling and/or pressing operation. This eliminates the necessity for employing hot rolled or mill sections—with attendant economy and efficiency of manufacture.

While only certain illustrative embodiments of the invention have been herein shown and described, it will be understood that the invention is not limited to these particular embodiments, but, on the contrary, is co-extensive with the scope of the appended claims.

We claim:

1. A wheel comprising a rim having an integral tire retaining side flange at one side thereof and an integral raised tire bead seat adjacent said flange, a removable side flange and a removable bead seat positioned upon the opposite side of the rim, a load carrying disk permanently connected to the rim, a retaining disk positioned to engage the outer face of said load carrying disk and the outer face of the removable side flange, and means for detachably connecting the retaining disk to the load carrying disk to lock the removable side flange and bead seat upon the rim.

2. A wheel as defined in claim 1 wherein the removable side flange and bead seat comprise a one piece member.

3. A wheel as defined in claim 1 wherein the load carrying disk, the rim and the integral tire retaining side flange comprise a one piece member.

4. A wheel as defined in claim 1 wherein said retaining disk is of substantially the same overall diameter as the removable side flange and is formed to conform to the configuration thereof.

5. A wheel as defined in claim 1 wherein said retaining disk overlies the load carrying disk throughout substantially the entire radial extent of the latter and serves as a reinforcement therefor.

6. A wheel as defined in claim 1 wherein the retaining disk is formed of thinner stock than the load carrying disk and is provided with reinforcing ribs adjacent its periphery.

7. A wheel as defined in claim 1 wherein the second one piece member is formed of thinner stock than the first one piece member and the second one piece member is reinforced by the retaining disk.

8. A wheel comprising a hub, a rim having an integral tire retaining side flange at one side thereof, a removable tire retaining flange for the other side of the rim, a load carrying disk connected to the hub at its inner periphery and to the rim at its outer periphery, a retaining disk engaging the outer face of the removable side flange and the load carrying disk, and means for detachably connecting the retaining disk to the load carrying disk and the hub.

9. A wheel as defined in claim 8 wherein said attaching means includes studs and nuts and wherein said retaining disk is formed to provide raised portions which are engaged by the nuts.

10. A wheel comprising a hub, a load carrying disk having its inner periphery secured to the hub; a rim carried by the disk at its outer periphery; said rim including a central generally cylindrical portion, raised tire bead seats axially outwardly of said portion, and tire retaining side flanges axially outwardly of said bead seats; the disk and the central portion of the rim and one of the tire bead seats and one of the tire retaining side flanges comprising a first one piece member; the other bead seat and tire flange comprising a second one piece member; and means for detachably connecting the two one piece members together, said means including a retaining disk which is detachably connected to the hub by the same means which secures the load carrying disk to the hub.

11. A wheel comprising a first one piece member including a rim base having an outturned tire retaining side flange at one side thereof and an inturned securing flange at the other side thereof, a second one piece member of generally L-shape in section including a substantially cylindrical portion mounted upon the rim base and a radial portion comprising a tire retaining side flange, the base of the rim provided with an axially elongated depression underlying the cylindrical portion of the second one piece member to provide a channel for a valve stem, and means including a retaining disk engaging the outer face of the side flange on the second member for detachably connecting the two members together, said retaining disk having an opening therein aligned with the axially elongated depression in the rim base.

J HAROLD HUNT.
HARRY J. HORN.